Dec. 26, 1922.

W. DE F. CROWELL.
CLEAR VISION WINDSHIELD.
FILED Nov. 4, 1920.

1,439,950

Inventor:
William de F. Crowell
by Bakewell & Church
Attorneys

Patented Dec. 26, 1922.

1,439,950

UNITED STATES PATENT OFFICE.

WILLIAM DE F. CROWELL, OF ST. LOUIS, MISSOURI.

CLEAR-VISION WINDSHIELD.

Application filed November 4, 1920. Serial No. 421,686.

*To all whom it may concern:*

Be it known that I, WILLIAM DE F. CROWELL, a citizen of the United States, residing at St. Louis, Missouri, have invented a certain new and useful Improvement in Clear-Vision Windshields, of which the following is a full, clear, and exact description, such as will enable others skilled in the art to which it appertains to make and use the same.

This invention relates to clear vision wind shields for vehicles.

One object of my present invention is to provide a clear vision wind shield of the updraft type that can be used successfully on a vehicle provided with a top or roof whose front end portion overhangs or projects forwardly beyond the part of the shield that forms the upper half or portion of the protecting wall at the front of the vehicle.

Another object is to provide a clear vision wind shield of the updraft type which is so constructed that rain can not pass downwardly through the portion of the shield that is used to induce an upward circulation of air over the front side of the shield, and enter the clear vision slot of the shield.

And still another object is to provide a clear vision updraft vacuum wind shield whose upper part is formed by an inverted trough which is of such design that the front wall of same can be used to form a sun shade or rain visor when the clear vision slot of the shield is not in use. Other objects and desirable features of my invention will be hereinafter pointed out.

Figure 1 of the drawings is a perspective view, illustrating a wind shield constructed in accordance with my invention.

Briefly stated, my present invention consists of a clear vision wind shield of the updraft type composed of an upper part in the form of a transversely-disposed, inverted trough open at its ends or provided at its ends with openings, and a lower part that deflects air upwardly into said inverted trough. The lower part of the shield cooperates with the rear wall of the inverted trough at the upper side of the shield to form a protecting wall for the front of the vehicle on which the shield is used and the top edge of said lower part is spaced far enough below the bottom edge of the rear wall of the inverted trough to form a clear vision slot that affords an unobstructed view for the driver or operator in charge of the vehicle in inclement weather. The lower part of the shield can be arranged or constructed in various ways without departing from the spirit of my invention, but it is essential that it be so disposed, when the clear vision slot is in use, that the upper edge of said lower part terminates at a point intermediate the front and rear walls of the inverted trough shaped portion of the shield and also below the bottom edges of said walls.

When the vehicle is traveling forwardly the lower part of the shield deflects air upwardly into the inverted trough of the shield and the air that rushes rearwardly past the open ends of said inverted trough creates a suction or partial vacuum that sucks out of said trough any air, rain, snow, dust or the like that has been deflected upwardly into said trough or sucked upwardly by the suction or partial vacuum created by the air rushing past the openings at the ends of the trough. The result is that an upward current of air is created in proximity to the clear vision slot of the shield of sufficient intensity to prevent wind, rain, snow and the like from blowing inwardly into the vehicle through the clear vision slot of the shield.

The members that constitute the shield can be formed of any suitable material and they can be stationarily mounted or mounted in such a manner that one or more of said members can be adjusted in various positions. I have not herein illustrated the specific details of construction of the members that constitute the shield or the means that would be used in practice for mounting or adjusting said members, as it is immaterial, so far as my present invention is concerned, how said members are constructed, supported, or adjusted, so long as the shield comprises an upper part in the form of a transversely-disposed, inverted trough of any preferred cross-sectional shape provided at its opposite ends with openings, and a part arranged below said inverted trough and so disposed with relation to same that it will direct air upwardly into said inverted trough without permitting a substantial amount of air to flow rearwardly under the lower edge of said part.

Figure 1:
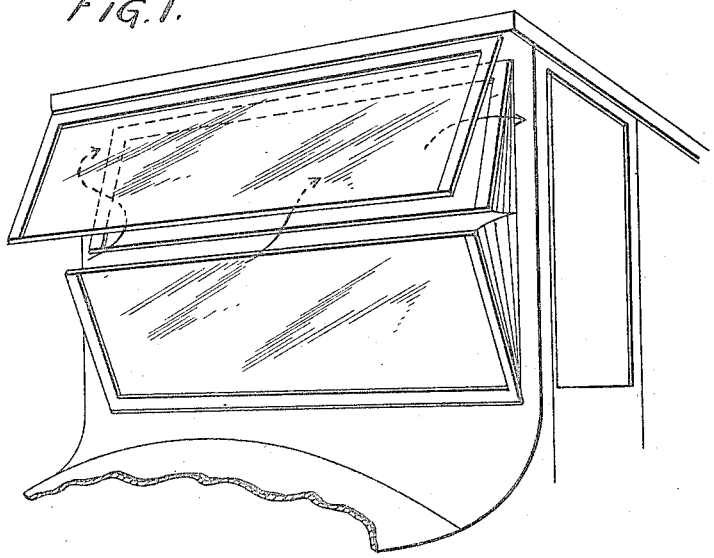
Figure 2:
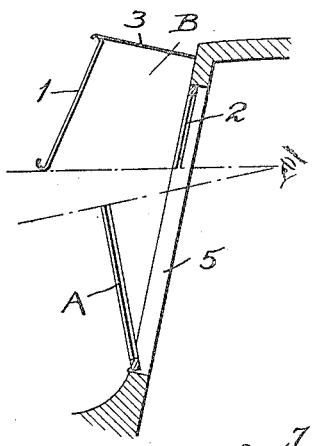
Figure 2 is a diagrammatic view, illustrating the principle of operation of the wind shield shown in Figure 1.

In the form of my invention illustrated in Figures 1 and 2 A designates the lower part of the shield which may consist of a transversely-disposed member arranged in an upright position, either vertical or slightly inclined, and B designates a transversely-disposed, inverted trough arranged above the member A with its front and rear walls 1 and 2, respectively, located in advance of and at the rear of the top edge of said member A. The bottom edge of the rear wall 2 of the inverted trough B terminates at a point high enough above the top edge of the member A of the shield to form a clear vision slot that extends transversely of the shield, and the bottom edge of the front wall 1 also terminates above the top edge of the member A, thus providing a space up through which air can circulate into the inverted trough B. In the form of my invention shown in Figure 1 the inverted trough B is closed at its upper side 3 so that the openings at the ends of same form the only outlets for the air, rain, snow or the like that enters the inverted trough B, thus insuring a suction or partial vacuum being created in the inverted trough of sufficient intensity to raise or lift particles of rain, snow, dust and the like across the clear vision slot of the shield. Accordingly, in inclement weather the occupants of the vehicle have an unobstructed view through the clear vision slot of the shield without being subjected to the discomfitures that would result if air, snow, rain or the like passed inwardly through the clear vision slot of the shield. While I prefer to use an inverted trough whose top side is completely closed, as shown in Figure 2, I wish it to be understood that my broad idea contemplates the use of an inverted trough of the kind shown in Figure 3, which is of such construction that some of the air and the like which enters the trough can escape through an opening at the upper side of the trough, instead of requiring all of the air to flow laterally through the trough and escape at the ends of the trough. The essential thing, so far as the trough is concerned, is that it be provided at its ends with openings for the escape of the air, rain, snow and the like that enters the trough and whether the trough is provided with a top portion that forms a complete or only a partial closure for the upper side of the trough is immaterial, so long as the main circulation of air is laterally through the openings at the ends of the trough.

I am aware of the fact that clear vision updraft wind shields have heretofore been devised, but such prior shields were provided with an open-ended, vertically-disposed flue for inducing a circulation of air upwardly over the front side of the shield, and thence rearwardly over the roof or top of the vehicle on which the shield is used. My present wind shield is distinguished from updraft wind shields of the type just referred to, in that it is so constructed that the main circulation of the air is laterally through openings at the ends of a transversely-disposed, inverted trough, thus making it posible, in some instances, to use a trough which is of such form that rain cannot pass downwardly through same and enter the clear vision slot of the shield.

Moreover, my wind shield can be successfully used on a vehicle provided with a top or roof whose front end portion 3$^a$ overhangs or projects forwardly beyond the upper part 2 of the shield that co-operates with the lower part A to form a protecting wall for the front of the vehicle. In the form of my invention shown in Figure 4 the front end portion 3$^a$ of the top of the vehicle forms the top portion of the inverted trough B of the shield, the front wall 1 of said inverted trough being connected to the front edge of the top of the vehicle and the wall 2 of said inverted trough being arranged at the rear of the wall 1. I wish it to be understood, however, that my improved shield is not limited to use with a vehicle whose top overhongs or projects forwardly beyond the part 2 of the shield, for if desired, the wall 2 of the inverted trough can be arranged at the extreme front end of the top of the vehicle, as shown in Figures 2 and 3.

The member A and the front and rear walls of the inverted trough B of the shield are preferably formed of glass or other suitable transparent material, and said parts are preferably carried principally by the usual side posts 5 at the front of the vehicle. In shields of the form shown in Figures 1, 2, 3, 5 and 6 the front wall 1 of the inverted trough B can be supported by forwardly-projecting arms 6 on the side posts 5 of the vehicle, but when the overhang of the top of the vehicle is used to form the top part of the inverted trough it is preferable to mount the front wall 1 on the front edge of said overhang. As previously stated, however, it is immaterial how the parts of the shield are mounted, so long as said parts are combined in such a manner that they form a transversely-disposed, open-ended, inverted trough at the upper side of the shield and a transversely-disposed member at the lower side of the shield whose upper edge terminates below and at a point intermediate the bottom edges of the front and rear walls of said inverted trough. Said inverted trough may be of any preferred shape in cross section, it can be formed by stationary or adjustable members, and the top side of same can be wholly or partially closed. The lower member A can be stationary or adjustable, but it is essential that said lower member A be mounted in such a manner that a perceptible amount of air cannot flow under the lower edge of same.

Figure 3:
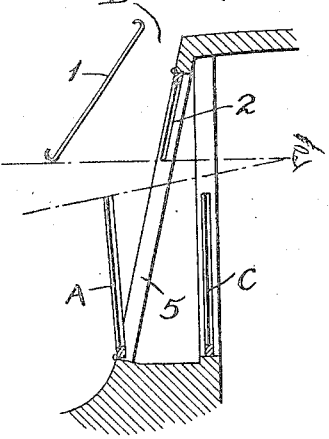
Figure 3 is a diagrammatic view, illustrating a wind shield of slightly different construction from the shield shown in Figure 1.

In Figure 3 of the drawings I have shown a wind shield provided with a rain interceptor C that is arranged at the rear of the lower member A of the shield, so as to protect the occupants of the vehicle from any drops of rain which might collect on the rear side of the member A and spatter over the occupants. This rain interceptor is not essential to the successful operation of my shield.

Figure 4:
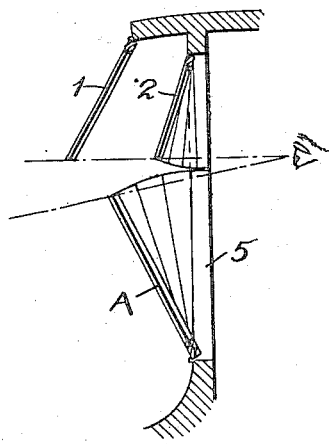
Figure 4 is a vertical sectional view, illustrating another form of my invention.

In the wind shield shown in Figure 4 of the drawings the rear wall 2 of the inverted trough B and the lower member A of the shield are pivotally mounted in such a manner that said parts can be swung rearwardly into alignment with each other when it is desired to close the clear vision slot of the shield, the wall 2 being pivotally mounted at its upper edge and the member A being pivotally mounted at its lower edge.

Figure 5:
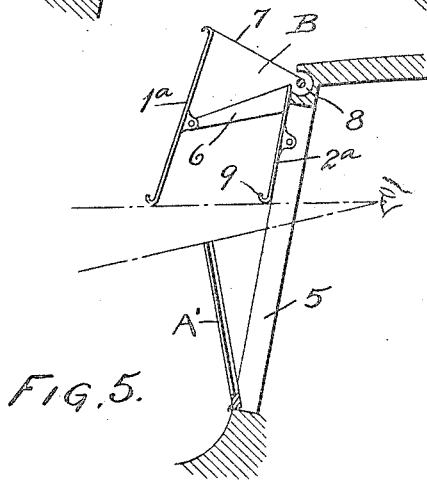
Figure 5 is a vertical sectional view, illustrating still another form of my invention, showing how the parts of the shield are adjusted when the clear vision slot is in use.
Figure 6:
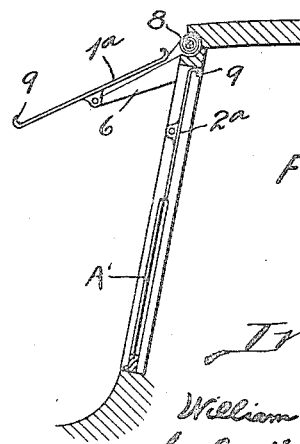
Figure 6 is a vertical sectional view of the wind shield illustrated in Figure 5, showing one way of adjusting the parts of the shield when the clear vision slot is not in use.

In Figures 5 and 6 I have illustrated still another form of my invention, wherein the front wall 1ª of the inverted trough B of the shield is so mounted that it can be arranged in such a position that it will serve as a sun shade or rain visor. The lower member A' of the shield is also mounted in such a manner that it can be arranged either in a position with its top edge substantially midway between the front and rear walls of the inverted trough B when the clear vision slot of the shield is in use, as shown in Figure 5, or swung rearwardly into alignment with the rear wall 2ª of the inverted trough of the shield when the clear vision slot of the shield is not in use, thus forming practically a solid protecting wall for the front of the vehicle. The member A' is preferably hinged at its lower edge and the front wall 1ª of the inverted trough is preferably hinged intermediate its top and bottom edges on forwardly-projecting arms or brackets 6 on the side posts 5 of the vehicle. The top part of the inverted trough B of the shield can be formed conveniently by a piece of fabric 7 connected at its front end to the upper edge of the front wall 1ª of the inverted trough and connected at its rear end to a roller 8 arranged transversely of the vehicle in proximity to the front end of the top or roof of the vehicle, and so constructed that it will take up the slack in the fabric 7 when the front wall 1ª of the inverted trough is swung rearwardly into position to serve as a sun shade or rain visor. The rear wall 2ª of the inverted trough is preferably revolubly mounted on the side posts 5 of the vehicle and is so proportioned that in one position, as shown in Figure 5, its bottom edge will terminate high enough above the top edge of the member A' to form a clear vision slot, and in its other position, as shown in Figure 6, its bottom edge will practically meet the top edge of said lower member A'. In the various forms of my invention above described it is preferable to arrange gutters 9 at the lower edges of the front and rear walls of the inverted trough B, so as to collect and carry away any water that drains down the front sides of said parts. When the rear wall 2ª of the inverted trough is revolubly mounted, as in the form of my invention illustrated in Figures 5 and 6, the gutter on said wall will be arranged at the extreme upper edge of the shield, where it is out of the way, when said rear wall is swung into the position shown in Figure 6, so as to close the clear vision slot of the shield.

Having thus described my invention, what I claim as new and desire to secure by Letters Patent, is:

1. A clear vision updraft wind shield, comprising a transversely-disposed, inverted trough arranged at the upper side of the shield and provided at its ends with openings, and means arranged below said inverted trough for deflecting or directing air upwardly into same.

2. A clear vision updraft wind shield, comprising a transversely-disposed, inverted trough arranged at the upper side of the shield and provided at its ends with openings, and a transversely-disposed member arranged under said trough for deflecting or directing air upwardly into said trough, said member being so mounted that a perceptible amount of air cannot flow rearwardly under the lower edge of same.

3. A clear vision updraft wind shield, comprising a transversely-disposed, inverted trough arranged at the upper side of the shield and provided at its ends with openings, and a transversely-disposed member arranged under said trough and so disposed that the upper edge of said member terminates intermediate the front and rear walls of said inverted trough and far enough below the bottom edges of said walls to form a clear vision slot or gap in the shield.

4. A clear vision updraft wind shield, comprising a top part composed of members that form a transversely-disposed, inverted trough provided at its ends with openings so as to cause the air and the like to flow laterally through said trough and escape at the ends of same when the vehicle on which the wind shield is used is traveling forwardly, and a member arranged under said inverted trough with its upper edge terminating below said inverted trough at a point intermediate the front and rear walls of same.

5. A clear vision updraft wind shield composed of a top part and a bottom part spaced apart so as to form a relatively narrow clear vision slot or gap, said bottom part consisting of a transversely-disposed, upright member mounted in such a manner that a perceptible amount of air cannot circulate under the lower edge of same and said top part consisting of a transversely-disposed, open-ended inverted trough arranged so that air will be sucked laterally out through the ends of same when the vehicle on which the shield is used is traveling forwardly.

6. A clear vision updraft wind shield, comprising a transversely-disposed, inverted trough arranged at the upper side of the shield and provided at its ends with openings, said inverted trough comprising a part that can be used to form a sun shade or rain visor when the clear vision slot of the shield is not in use, and a means arranged under said trough for deflecting or directing air upwardly into same.

7. A clear vision updraft wind shield, comprising an upper part in the form of a transversely-disposed, inverted trough provided at its ends with openings, and a lower part consisting of a transversely-disposed member arranged so that it will deflect or direct air upwardly into said inverted trough, said lower part and the rear wall of said inverted trough being adapted to be arranged in alignment with each other when it is desired to close the clear vision slot of the shield.

8. A clear vision updraft wind shield, comprising a transversely-disposed, inverted trough arranged at the upper side of the shield and provided at its ends with openings, and a transversely-disposed lower member mounted so that it can be arranged either in alignment with the rear wall of said inverted trough or in a position with its top edge terminating intermediate the front and rear walls of said inverted trough and below the bottom edges of said walls.

9. A clear vision updraft wind shield, comprising a transversely-disposed, inverted trough arranged at the upper side of the shield and provided at its ends with openings, said inverted trough comprising a part that is adapted to be arranged in a position to serve as a sun shade or rain visor, and a transversely-disposed member arranged below said inverted trough and adapted to be positioned in alignment with the rear wall of said inverted trough or in such a position that its upper edge terminates at a point below and intermediate the bottom edges of the front and rear walls of said inverted trough.

10. A clear vision updraft wind shield, comprising a transversely-disposed, inverted trough arranged at the upper side of the shield and provided at its ends with openings, said inverted trough having adjustable front and rear walls for the purpose described, and a transversely-disposed, adjustable member arranged under said trough for deflecting or directing air upwardly into same.

11. A clear vision updraft wind shield, comprising a transversely-disposed, inverted trough arranged at the upper side of the shield and provided at its ends with openings, and a transversely-disposed lower member hinged at its bottom edge and adapted to be arranged in alignment with the rear wall of said inverted trough or in a position where its top edge terminates at a point intermediate the front and rear walls of said inverted trough and far enough below the bottom edges of said walls to form a clear vision slot.

WILLIAM DE F. CROWELL.